(12) United States Patent
Chang

(10) Patent No.: US 7,201,390 B2
(45) Date of Patent: Apr. 10, 2007

(54) SCOOTER OPERATED MANUALLY OR AUTOMATICALLY

(76) Inventor: Hung-Shen Chang, 22, Xin Yi St., Taoyuan (TW)

( * ) Notice: Subject to any disclaimer, the term of this patent is extended or adjusted under 35 U.S.C. 154(b) by 169 days.

(21) Appl. No.: 11/006,793

(22) Filed: Dec. 7, 2004

(65) Prior Publication Data
US 2006/0119067 A1  Jun. 8, 2006

(51) Int. Cl.
*B62M 1/02* (2006.01)
(52) U.S. Cl. .............. 280/259; 280/261; 280/260; 280/288.4; 180/205; 180/207; 180/220
(58) Field of Classification Search ............ 280/259, 280/260, 261; 180/205, 207, 220
See application file for complete search history.

(56) References Cited

U.S. PATENT DOCUMENTS

| 1,073,696 A * | 9/1913 | Meschkat .................. 280/261 |
| 6,352,131 B1 * | 3/2002 | Lin et al. .................... 180/207 |
| 6,516,685 B2 * | 2/2003 | Wang ......................... 74/594.2 |
| 6,929,276 B2 * | 8/2005 | Varan ......................... 280/261 |
| 2001/0022246 A1 * | 9/2001 | Dunbridge et al. ........ 180/65.8 |
| 2002/0109330 A1 * | 8/2002 | Tompsett .................... 280/259 |
| 2004/0130120 A1 * | 7/2004 | Matsumoto et al. ........ 280/260 |
| 2005/0263978 A1 * | 12/2005 | Ascher ....................... 280/261 |

* cited by examiner

*Primary Examiner*—Lesley D. Morris
*Assistant Examiner*—Marlon Arce-Diaz
(74) *Attorney, Agent, or Firm*—Alan D. Kamrath; Nikolai & Mersereau, P.A.

(57) ABSTRACT

A scooter includes a main body, a rear wheel mounted on a rear end of the main body, and an operation mechanism mounted on the main body and connected to the rear wheel to move the rear wheel. When in use, the rider steps on the two pedals to move the scooter forward manually. Alternatively, the scooter is moved forward automatically by operation of the motor. Thus, the scooter is operated manually by the user's feet or operated automatically by an electric power. In addition, the operation mechanism is detachably mounted on the main body, thereby facilitating the rider using and folding the scooter.

10 Claims, 5 Drawing Sheets

SCOOTER OPERATED MANUALLY OR AUTOMATICALLY

BACKGROUND OF THE INVENTION

1. Field of the Invention

The present invention relates to a scooter, and more particularly to a scooter that is operated manually by user's feet or operated automatically by an electric power.

2. Description of the Related Art

A conventional scooter comprises a main body, a front wheel mounted on a front end of the main body, a handle mounted on the front end of the main body to control the steering direction of the front wheel, and a rear wheel mounted on a rear end of the main body. When a user operates the scooter, one foot is stepped on the main body and the other foot is stepped on the ground to produce a power to move the scooter forward. However, the conventional scooter is moved forward manually, thereby wasting the manual work. In addition, the conventional scooter is only available for a shorter travel.

SUMMARY OF THE INVENTION

In accordance with the present invention, there is provided a scooter, comprising: a main body; a rear wheel mounted on a rear end of the main body; and an operation mechanism mounted on the main body and connected to the rear wheel to move the rear wheel.

The primary objective of the present invention is to provide a scooter that is operated manually by user's feet or operated automatically by an electric power.

Another objective of the present invention is to provide a scooter, wherein the rider steps on the two opposite pedals to move the scooter forward manually.

A further objective of the present invention is to provide a scooter, wherein the scooter is moved forward automatically by operation of the motor.

A further objective of the present invention is to provide a scooter, wherein the operation mechanism is detachably mounted on the main body, thereby facilitating the rider using and folding the scooter.

Further benefits and advantages of the present invention will become apparent after a careful reading of the detailed description with appropriate reference to the accompanying drawings.

DETAILED DESCRIPTION OF THE INVENTION

Figure 1:
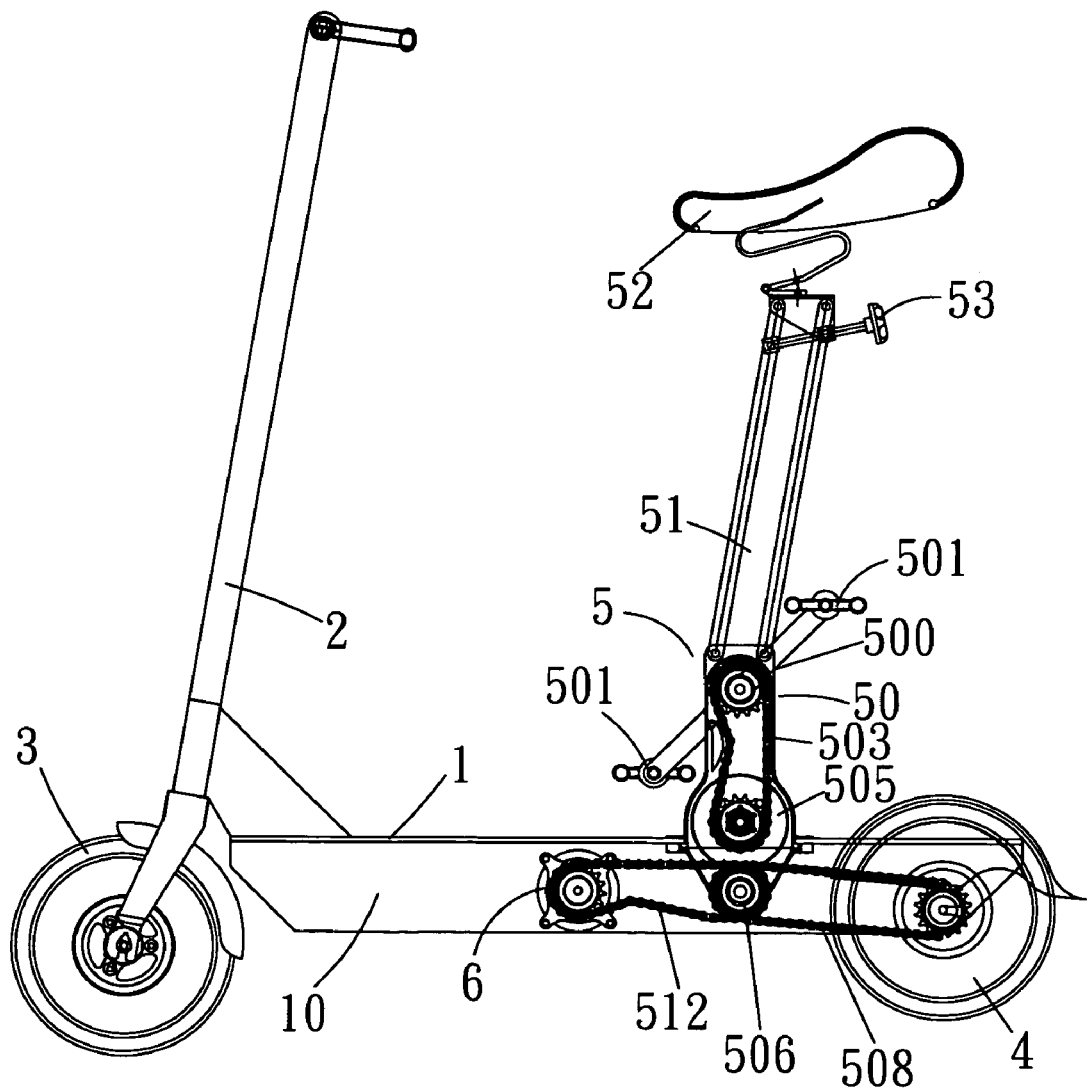
FIG. 1 is a side plan cross-sectional view of a scooter in accordance with the preferred embodiment of the present invention.

Referring to the drawings and initially to FIGS. 1–4, a scooter in accordance with the preferred embodiment of the present invention comprises a main body 1, a front wheel 3 mounted on a front end of the main body 1, a handle 2 mounted on the front end of the main body 1 to control the steering direction of the front wheel 3, a rear wheel 4 mounted on a rear end of the main body 1, a reinforcement rib 10 mounted on a bottom of the main body 1, and an operation mechanism 5 mounted on the main body 1 and connected to the rear wheel 4 to move the rear wheel 4.

The operation mechanism 5 is detachably mounted on the main body 1 and includes a driving device 50 detachably mounted on the main body 1, and a seat tube 51 mounted on the driving device 50.

The seat tube 51 is mounted on an upper portion of the driving device 50 and has an upper end provided with a seat 52, and an adjusting device 53 to adjust an angle of the seat 52.

Figure 2:
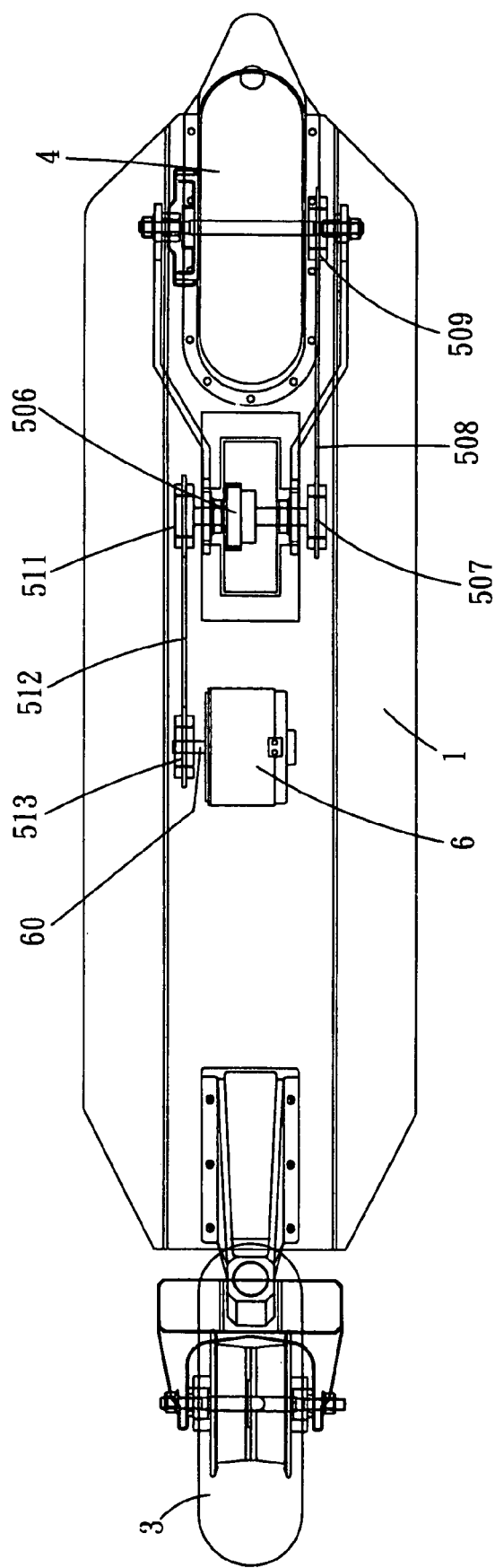
FIG. 2 is a bottom plan cross-sectional view of the scooter as shown in FIG. 1.

The driving device 50 includes a housing 500 detachably mounted on the main body 1, a first sprocket 502 rotatably mounted in a first end of the housing 500, two opposite pedals 501 each having an end secured to the first sprocket 502 to rotate the first sprocket 502, a second sprocket 504 rotatably mounted in a second end of the housing 500, a first chain 503 meshing with the first sprocket 502 and the second sprocket 504 so that the second sprocket 504 is rotated by the first sprocket 502, a first driving gear 505 secured on and coaxial with the second sprocket 504 to rotate therewith, a second driving gear 506 rotatably mounted on the main body 1 and meshing with the first driving gear 505, a third sprocket 507 secured on and coaxial with the second driving gear 506 to rotate therewith, a fourth sprocket 509 secured on and coaxial with the rear wheel 4 to rotate the rear wheel 4, and a second chain 508 meshing with the third sprocket 507 and the fourth sprocket 509 so that the fourth sprocket 509 is rotated by the third sprocket 507. Preferably, the third sprocket 507 is secured on a first side of the second driving gear 506 as shown in FIG. 2.

The driving device 50 further includes a fifth sprocket 511 secured on and coaxial with the second driving gear 506 to rotate the second driving gear 506, a motor 6 mounted on the main body 1 and having a propeller shaft 60, a sixth sprocket 513 secured on and coaxial with the propeller shaft 60 of the motor 6 to rotate therewith, and a third chain 512 meshing with the fifth sprocket 511 and the sixth sprocket 513 so that the fifth sprocket 511 is rotated by the sixth sprocket 513. Preferably, the fifth sprocket 511 is secured on a second side of the second driving gear 506 and coaxial with the third sprocket 507 as shown in FIG. 2.

Figure 3:
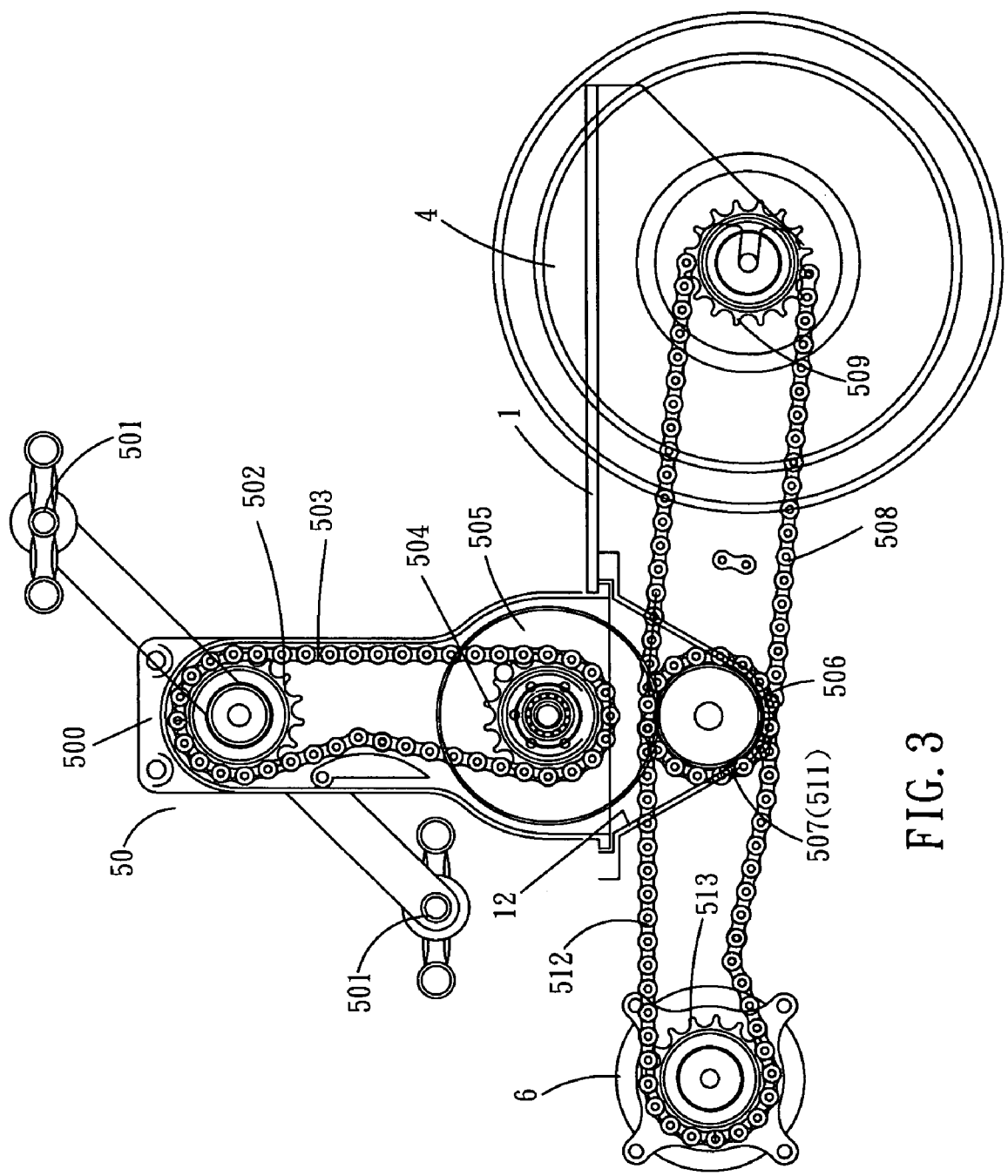
FIG. 3 is a partially enlarged cross-sectional view of the scooter as shown in FIG. 1.
Figure 4:
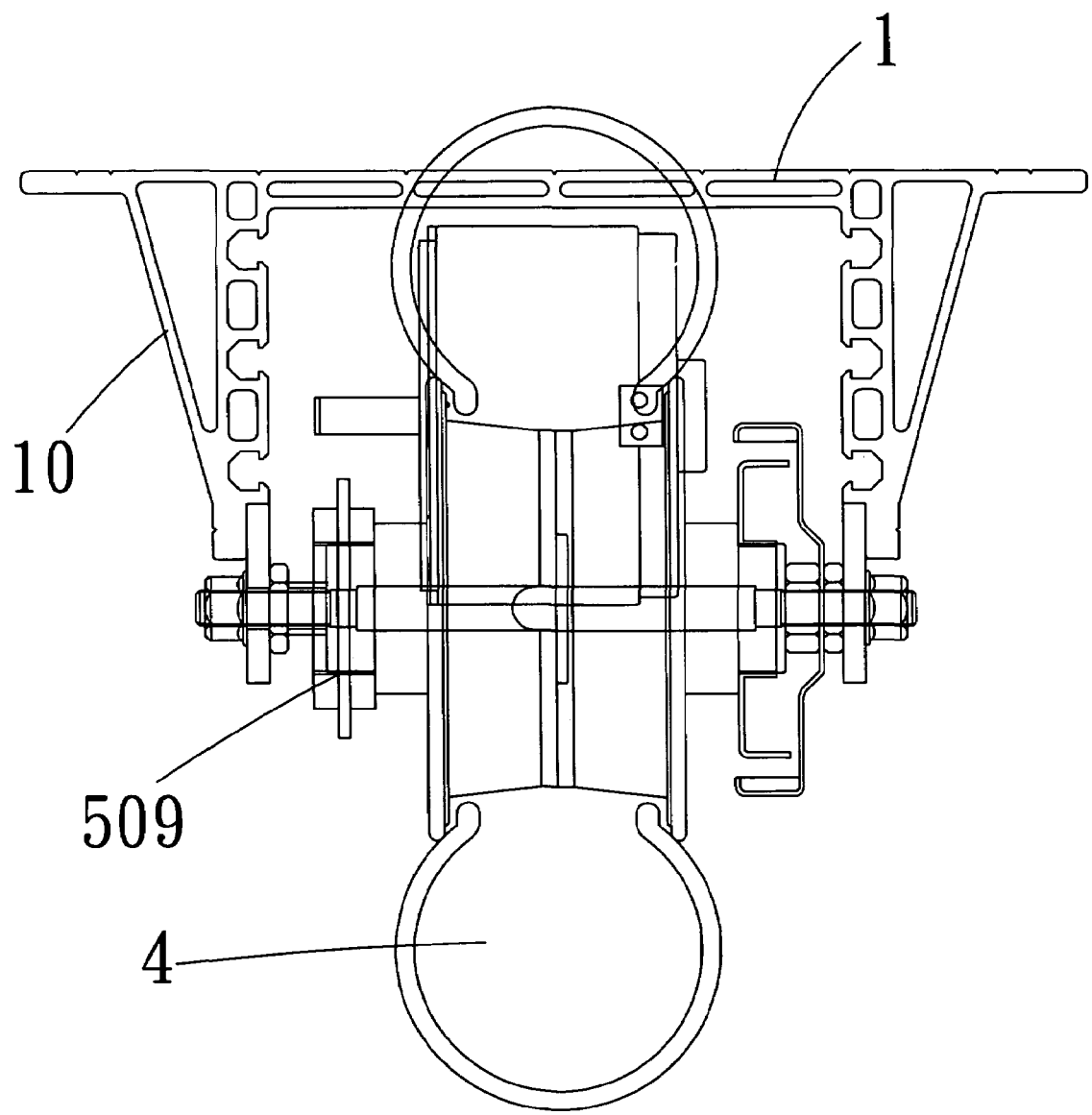
FIG. 4 is a partially enlarged rear plan view of the scooter as shown in FIG. 1.

In operation, referring to FIG. 3, when the two opposite pedals 501 are stepped by a rider, the first sprocket 502 is rotated by the two opposite pedals 501 to rotate the first chain 503 which rotates the second sprocket 504 which rotates the first driving gear 505 which rotates the second driving gear 506 which rotates the third sprocket 507 which rotates the second chain 508 which rotates the fourth sprocket 509 which rotates the rear wheel 4, so that the rear wheel 4 is rotated to move forward by the rider stepping the two opposite pedals 501. Thus, the rider steps on the two opposite pedals 501 to move the scooter forward manually.

Alternatively, when the motor 6 is actuated, -the propeller shaft 60 of the motor 6 is rotated to rotate the sixth sprocket 513 which rotates the third chain 512 which rotates the fifth sprocket 511 which rotates the second driving gear 506 which rotates the third sprocket 507 which rotates the second chain 508 which rotates the fourth sprocket 509 which rotates the rear wheel 4, so that the rear wheel 4 is rotated to move forward by operation of the motor 6. Thus, the scooter is moved forward automatically by operation of the motor 6.

Figure 5:
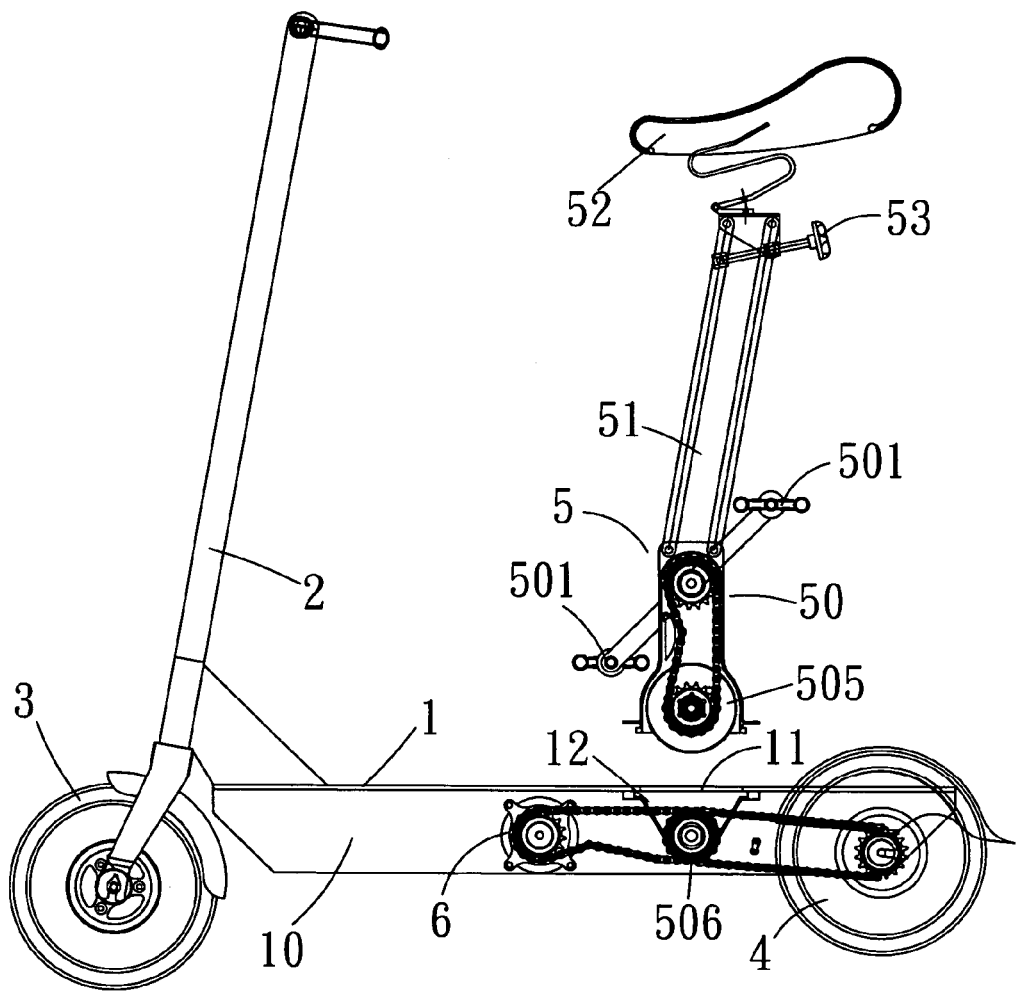
FIG. 5 is a plan exploded view of the scooter as shown in FIG. 1.

As shown in FIGS. 1 and 5, the main body 1 is formed with a receiving opening 12 to receive the second driving gear 506, and the first driving gear 505 is detachably inserted into the receiving opening 12 of the main body 1 to mesh with the second driving gear 506.

When the first driving gear 505 of the driving device 50 is detached from the receiving opening 12 of the main body 1, a cover 11 is inserted into the receiving opening 12 of the main body 1 to close the receiving opening 12 of the main body 1.

Accordingly, the rider steps on the two opposite pedals 501 to move the scooter forward manually. In addition, the scooter is moved forward automatically by operation of the motor 6. Further, the operation mechanism 5 is detachably mounted on the main body 1, thereby facilitating the rider using and folding the scooter.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A scooter, comprising:
   a main body;
   a rear wheel mounted on a rear end of the main body;
   an operation mechanism mounted on the main body and connected to the rear wheel to move the rear wheel;
   wherein the operation mechanism includes a driving device detachably mounted on the main body to move the rear wheel;
   wherein the driving device includes:
   a first sprocket;
   two opposite pedals each having an end secured to the first socket to rotate the first sprocket;
   a second sprocket;
   a first chain meshing with the first sprocket and the second sprocket so that the second sprocket is rotated by the first sprocket;
   a first driving gear secured on and coaxial with the second sprocket to rotate therewith;
   a second driving gear rotatably mounted on the main body and meshing with the first driving gear;
   a third sprocket secured on and coaxial with the second driving near to rotate therewith;
   a fourth sprocket secured on and coaxial with the rear wheel to rotate the rear wheel; and
   a second chain meshing with the third socket and the fourth socket so that the fourth sprocket is rotated by the third sprocket.

2. The scooter in accordance with claim 1, wherein the operation mechanism is detachably mounted on the main body.

3. The scooter in accordance with claim 1, wherein the driving device further includes a housing detachably mounted on the main body, the first sprocket is rotatably mounted in a first end of the housing, the second sprocket rotatably mounted in a second end of the housing.

4. The scooter in accordance with claim 1, wherein the driving device further includes:
   a fifth sprocket secured on and coaxial with the second driving gear to rotate the second driving gear;
   a motor mounted on the main body and having a propeller shaft;
   a sixth sprocket secured on and coaxial with the propeller shaft of the motor to rotate therewith; and
   a third chain meshing with the fifth sprocket and the sixth sprocket so that the fifth sprocket is rotated by the sixth sprocket.

5. The scooter in accordance with claim 4, wherein the third sprocket is secured on a first side of the second driving gear, and the fifth sprocket is secured on a second side of the second driving gear and coaxial with the third sprocket.

6. The scooter in accordance with claim 1, wherein the main body is formed with a receiving opening to receive the second driving gear.

7. The scooter in accordance with claim 6, wherein the first driving gear is detachably inserted into the receiving opening of the main body to mesh with the second driving gear.

8. The scooter in accordance with claim 7, further comprising a cover inserted into the receiving opening of the main body to close the receiving opening of the main body when the first driving gear of the driving device is detached from the receiving opening of the main body.

9. The scooter in accordance with claim 1, wherein the operation mechanism further includes a seat tube mounted on the driving device.

10. The scooter in accordance with claim 9, wherein the seat tube is mounted on an upper portion of the driving device and has an upper end provided with a seat, and an adjusting device to adjust an angle of the seat.

* * * * *